US 12,130,871 B2

(12) United States Patent
Cao et al.

(10) Patent No.: US 12,130,871 B2
(45) Date of Patent: Oct. 29, 2024

(54) FRONT PAGE NEWS PREDICTION AND CLASSIFICATION METHOD

(71) Applicant: CHINA ELECTRONICS TECHNOLOGY GROUP CORPORATION NO.10 RESEARCH INSTITUTE, Sichuan (CN)

(72) Inventors: Kaichen Cao, Sichuan (CN); Lican Dai, Sichuan (CN); Bing Zeng, Sichuan (CN); Wen Sun, Sichuan (CN); Wanli Liu, Sichuan (CN); Shou Feng, Sichuan (CN)

(73) Assignee: CHINA ELECTRONICS TECHNOLOGY GROUP CORPORATION NO.10 RESEARCH INSTITUTE, Sichuan (CN)

( * ) Notice: Subject to any disclaimer, the term of this patent is extended or adjusted under 35 U.S.C. 154(b) by 1 day.

(21) Appl. No.: 17/785,428

(22) PCT Filed: Aug. 10, 2021

(86) PCT No.: PCT/CN2021/111885
§ 371 (c)(1),
(2) Date: Jun. 15, 2022

(87) PCT Pub. No.: WO2022/037446
PCT Pub. Date: Feb. 24, 2022

(65) Prior Publication Data
US 2023/0244757 A1 Aug. 3, 2023

(30) Foreign Application Priority Data
Aug. 20, 2020 (CN) .......................... 202010845229.0

(51) Int. Cl.
G06F 16/951 (2019.01)
G06F 18/2415 (2023.01)
G06F 40/279 (2020.01)

(52) U.S. Cl.
CPC ........ *G06F 16/951* (2019.01); *G06F 18/2415* (2023.01); *G06F 40/279* (2020.01)

(58) Field of Classification Search
None
See application file for complete search history.

(56) References Cited

U.S. PATENT DOCUMENTS

| 2007/0143279 A1 | 6/2007 | Yao et al. |
| 2019/0179858 A1 | 6/2019 | Douze et al. |

(Continued)

FOREIGN PATENT DOCUMENTS

| CN | 101281519 A | 10/2008 |
| CN | 102937960 A | 2/2013 |

(Continued)

OTHER PUBLICATIONS

Mayur, Datar et al; <Locality-Sensitive Hashing Scheme Based on p-Stable Distributions>; «Proceedings of the twentieth annual symposium on Computational geometry»; Jun. 30, 2004; pp. 253-262.

(Continued)

*Primary Examiner* — Antim G Shah
(74) *Attorney, Agent, or Firm* — Samson G. Yu

(57) ABSTRACT

The present application discloses a frontpage news prediction and classification method. Keywords to be queried are firstly input by means of a user interface, and collected news text information on the web pages is saved in a local database; a text representation module performs vector representation by using a Doc2Vec representation algorithm, so as to convert each news text into a low-dimensional text feature vector with a high amount of information; and a (Continued)

similarity network construction module calculates the similarity between news, constructs a news similarity network by taking a calculated similarity matrix as an adjacent matrix of a news related network, determines whether a similarity network is traversed, if so, iteratively calculates an HR value of the vector according to an H-index supporting contribution matrix, performs weight sorting on the news by using the HR value, and predicts top-N pieces of news as front page news.

8 Claims, 1 Drawing Sheet

(56) References Cited

U.S. PATENT DOCUMENTS

| | | | |
|---|---|---|---|
| 2019/0332849 A1 | 10/2019 | Gupta et al. | |
| 2021/0089579 A1* | 3/2021 | Shu | H04L 51/02 |
| 2021/0109968 A1* | 4/2021 | Kim | G06F 40/295 |

FOREIGN PATENT DOCUMENTS

| | | |
|---|---|---|
| CN | 106599181 A | 4/2017 |
| CN | 107315797 A | 11/2017 |
| CN | 107644010 A | 1/2018 |
| CN | 109213869 A | 1/2019 |
| CN | 109492157 A | 3/2019 |
| CN | 109740044 A | 5/2019 |
| CN | 109918621 A | 6/2019 |
| CN | 111061996 A | 4/2020 |
| CN | 112100372 A | 12/2020 |

OTHER PUBLICATIONS

Cao Kai-Chen et al; <Research on Importance Evaluation of News Based on Nodal Centralities of Complex Network>; «Journal of University of Electronic Science and Technology of China»; Mar. 31, 2021; pp. 285-293; vol. 50, No. 2.
Corresponding CN First search issued on May 7, 2022.
Corresponding International Search Report issued on Oct. 9, 2021.
Corresponding CN Supplementary search issued on Jun. 29, 2022.

* cited by examiner

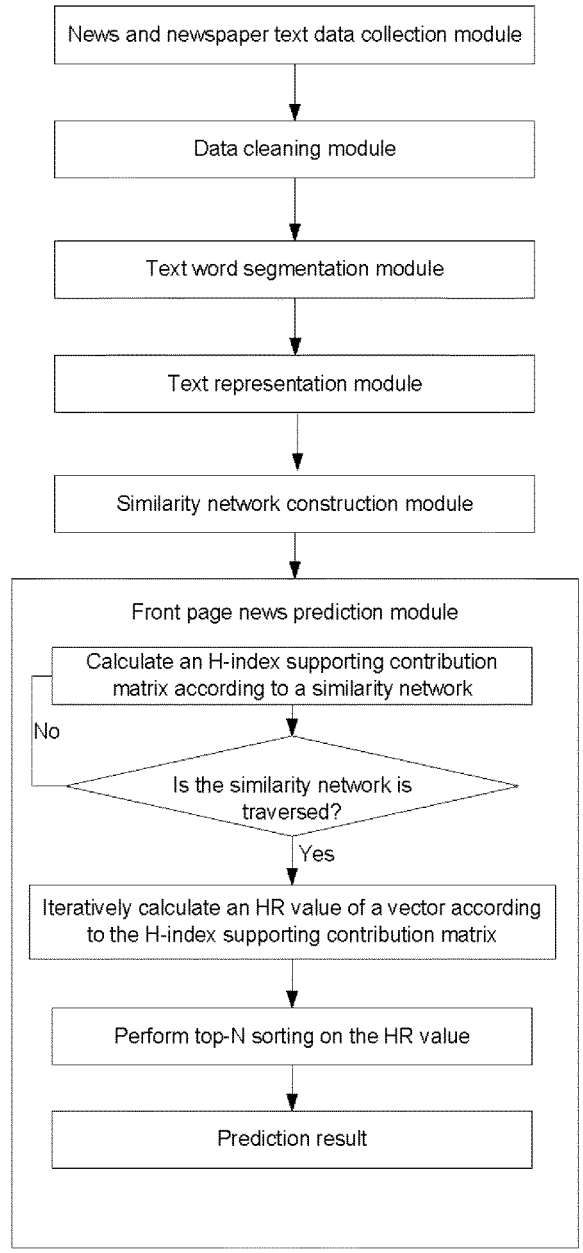

FRONT PAGE NEWS PREDICTION AND CLASSIFICATION METHOD

CROSS-REFERENCE TO RELATED APPLICATION

The present application claims the priority of Chinese Application No. 202010845229.0, filed in the Chinese Patent Office on Aug. 20, 2020, and entitled "Front Page News Prediction and Classification Method", the entire contents of which are herein incorporated by reference.

TECHNICAL FIELD

The present invention relates to the fields of natural language processing and artificial intelligence prediction and classification, and in particular to an intelligent prediction method for front page news of newspapers and periodicals.

BACKGROUND

News media has many functions such as information dissemination, political propaganda, education diffusion, public opinion supervision, social services, cultural entertainment and so on. The exertion of these functions must be realized by means of specific news reports, so report effect objectives are correspondingly diversified. For example, a certain policy, concept or proposition is propagated by means of reports; social drawbacks are exposed and solution to problems are promoted by means of critical reports; the latest information is disseminated and social environments are monitored by means of follow-up reports; and by means of the combination of activity planning and news reports, services and entertainments are provided for the public, or moral education is conducted, and social problems are solved, or newspaper images are shaped and the social influence is expanded, etc. The frontpage news of authoritative newspapers and periodicals usually reports important information related to national political and economic policies, representing the development direction of national political, foreign and economic policies. In particular, the frontpage news has decisive guidance for the national political and economic policies in different periods, and is used by the outside world as one of the channels for analyzing changes in the political and economic policies of various countries. Therefore, it is of great significance to correctly predict the frontpage news of national newspapers and periodicals for judging changes in the national policies.

The rapid growth of information technology drives the networkization of life, and there are various networks in life: online social networks, scientific research networks and transportation networks. A social network is a networked structure that is a contact established by people by means of various relationships and is formed by the interaction between members. Asocial network analysis method is to analyze relationship structures or attributes of the social network, actors can be people, communities or groups and the like, and the relationship therebetween can reflect certain phenomena or data. Many of the data can be expressed as a binary graph $G=(V, E)$, wherein V represents a set of members studied, and E represents a set of relationships between the members. A prominent feature of the social network is the existence of a few key nodes, which play an important role in studying the functions of the network and maintaining the stability of the network. For example, when the network is deliberately attacked by the outside world, the attack on the key nodes will lead to the paralysis of the entire network. The importance (centrality) ranking of network nodes is an urgent problem to be solved, which is of great significance for processing information streams, preventing infectious transmission and other important behaviors on the network.

A large number of complex systems that exist in the nature can be described by different complex networks. A typical complex network is composed of many nodes and links between the nodes, wherein the nodes are used for representing different individuals in a real system, and the links are used for representing the relationship between the individuals. The news media is a news network formed by the interconnection of different news. In the research field of the complex networks, it is extremely important to determine the core status of the nodes. Applications thereof include identifying the most influential people in social networks, critical infrastructure nodes in the Internet or urban networks, and super-spreaders of diseases. The concept of centrality is firstly developed in social network analysis, and many terms used for measuring the centrality reflect their sociological origins. A centrality index is a quantitative description of the core status of a node, thereby reflecting the importance of the node in the network. The word "importance" has many meanings, leading to many different definitions of centrality, and there are mainly two different interpretations at present. "Importance" can be considered to be related to the type of flow or transmission on the network, such that the centrality can be defined according to the dependence on the nodes in a resource allocation process. "Importance" can also be regarded as the contribution of the nodes to network cohesion, such that the centrality can be defined by measuring the contribution of the nodes to network cohesion. By studying the causes of frontpage news in authoritative newspapers and periodicals by studying the centrality of network nodes, a hypothesis can be given from an intuitive point of view so as to explain the causes of the frontpage news, that is, "in a news network, the greater the centrality of the news is, the higher the possibility of it becoming the front page news". Therefore, it is of a great research value to realize the prediction and classification of the front page news by predicting the centrality of nodes in the news network.

SUMMARY

The task of the present invention is to provide a frontpage news prediction and classification method that can take into account both local centrality and global centrality, and can show better frontpage news prediction results.

In order to achieve the above invention purpose, the present invention provides a frontpage news prediction and classification method, including the following steps: constructing a news network topology with high clustering performance, assortativity and approximate powerlaw degree distribution performance by using news text data, firstly inputting keywords to be queried by means of a user interface, collecting web pages on the Internet, compiling a web crawler by using an object-oriented programming language Python, loading the web crawler into a news and newspaper text data collection module, and storing collected news text information on the web pages in a local database; a data cleaning module performing data cleaning on original data obtained from a website; a text word segmentation module performing word segmentation on the cleaned data by using stuttering word segmentation; a text representation module performing vector representation by using a Doc2Vec representation algorithm, so as to convert each news text into a low-dimensional text feature vector with a high amount of information; a similarity network construction module calculating the similarity between news by using a locality-sensitive hashing (LSH) algorithm, so as to obtain a sparse similarity matrix, and constructing a news similarity network by taking the similarity matrix obtained by LSH calculation as an adjacent matrix of a news related network; and a front page news prediction module introducing an H index into a PageRank algorithm, calculating an H-index supporting contribution matrix according to the similarity network, and determining whether the similarity network is traversed, if so, iteratively calculating an HR value of the vector according to the H-index supporting contribution matrix, performing weight sorting on the news by using the HR value, and predicting top-N pieces of news as front page news.

Compared with the prior art, the present invention has the following beneficial effects:

In the present invention, the news network topology with high clustering performance, assortativity and approximate powerlaw degree distribution performance is constructed by using the news text data, the news and newspaper text data collection module firstly inputs the keywords to be queried by means of the user interface, collects the web pages on the Internet, and compiles the web crawler by using the Python, and a crawling program saves the collected news text information on the web pages in the local database according to the input related information. An H-centrality sorting algorithm is combined with a PageRank sorting algorithm, and the advantages of considering both local centrality and global centrality are utilized to effectively alleviate the computational burden of a super-large matrix multiplication caused by random walks in huge networks, and to reduce search result errors caused by the Page Rank algorithm being affected by directly connected nodes with less importance.

In the present invention, the data cleaning module performs data cleaning on the original data obtained from the website; the text word segmentation module performs word segmentation on the cleaned data by using stuttering word segmentation; and the text representation module performs vector representation by using the Doc2Vec representation algorithm, so as to convert each news text into a low-dimensional text feature vector with a high amount of information, constructs and analyzes a news network from a brand new perspective of complex networks, and gives a highly interpretable hypothesis for the causes of front page news.

The similarity network construction module of the present invention calculates the similarity between news by using the locality-sensitive hashing (LSH) algorithm, so as to obtain a sparse similarity matrix, and constructs the news similarity network by taking the similarity matrix obtained by LSH calculation as the adjacent matrix of the news related network; and an efficient Top-N front page news prediction model is constructed, which shows better front page news prediction results on four evaluation indicators compared with other node ranking algorithms.

BRIEF DESCRIPTION OF THE DRAWINGS

FIG. 1 is a flow diagram of front page news prediction and classification according to the present invention.

DETAILED DESCRIPTION OF THE EMBODIMENTS

Referring to FIG. 1, according to the present invention, a news network topology with high clustering performance, assortativity and approximate powerlaw degree distribution performance is constructed by using news text data, firstly keywords to be queried are input by means of a user interface, web pages are collected on the Internet, a web crawler is compiled by using an object-oriented programming language Python, and is loaded into a news and newspaper text data collection module, and the collected news text information on the web pages is saved in a local database; a data cleaning module performs data cleaning on original data obtained from a website; a text word segmentation module performs word segmentation on the cleaned data by using stuttering word segmentation; a text representation module performs vector representation by using a Doc2Vec representation algorithm, so as to convert each news text into a low-dimensional text feature vector with a high amount of information; a similarity network construction module calculates the similarity between news by using a locality-sensitive hashing (LSH) algorithm, so as to obtain a sparse similarity matrix, and constructs a news similarity network by taking the similarity matrix obtained by LSH calculation as an adjacent matrix of a news related network; and a front page news prediction module introduces an H index into a PageRank algorithm, calculates an H-index supporting contribution matrix according to the similarity network, and determines whether the similarity network is traversed, if so, iteratively calculates an HR value of the vector according to the H-index supporting contribution matrix, performs weight sorting on the news by using the HR value, and predicts top-N pieces of news as front page news.

The specific implementation steps are as follows:

Step 1: the news and newspaper text data collection module compiles the web crawler by using Python, so as to save news text information on the web pages in the format of "time-title-text-page number", and to save the same locally.

Step 2: the data cleaning module performs data cleaning on the original data obtained from the website. For example, if there is "picture news" in the original data, the picture news only contains pictures but no text content, the data cleaning module deletes some junk information in the original data, then regularizes the data format to delete punctuation, spaces and the like in the text for subsequent word segmentation operations, and meanwhile converts time into a standard 8-bit form YYYYMMDD.

Step 3: the text word segmentation module performs word segmentation on the cleaned data by using stuttering word segmentation.

Step 4: the text representation module performs vector representation by using the Doc2Vec representation algorithm, so as to convert each news text into a low-dimensional text feature vector with a high amount of information;

(1) the text representation module constructs a sum vector of a word t in news $$i:h(w_t|p_i) = \sum_{k=-\frac{T}{2}}^{\frac{T}{2}} w_{t+i} + p_i;$$

wherein, $n(w_t|p_i)$ represents the sum vector of the word t in the news i, $w_t$ represents a one-hot encoding vector corresponding to the word t in the news, $p_i$ represents a one-hot encoding vector corresponding to the news i, and T represents the number of context words considered in the Doc2Vec algorithm;

(2) the text representation module substitutes the sum vector into a neural network model of the Doc2Vec algorithm for training, so as to obtain the following output function y of the neural network model: y=Soft max(k(w$_t$|p$_i$)W)+b;

wherein, y represents an output of the neural network model, h(w$_t$|p$_i$) represents the sum vector of the word t in the news i, W represents a hidden layer weight in the neural network model of the Doc2Vec algorithm, and b represents an offset;

(3) the text representation module constructs the following loss function Loss=ΣD(y,w$_t$) by using the above output function, and optimizes the loss function to obtain a hidden layer weight W$_{best}$ matrix and a b$_{best}$ offset;

wherein, D(•) represents a second-order Euclidean distance between vectors, y represents the output function of the neural network model, and w$_t$ represents the one-hot encoding vector corresponding to the word t in the news; and (4) the text representation module obtains, with the one-hot encoding vector p$_i$ corresponding to the news i as an input and according to the hidden layer weight W$_{best}$ in the trained neural network model, a low-dimensional text feature vector representation R$_i$: R$_i$=p$_i$·W$_{best}$.

Step 5: the similarity network construction module calculates the similarity between news by using the locality-sensitive hashing (LSH) algorithm, so as to obtain a sparse similarity matrix with a size of "number of news×number of news", and constructs the news similarity network by taking the similarity matrix obtained by LSH calculation as the adjacent matrix of the news related network.

Step 6: the front page news prediction module introduces the H index into the PageRank algorithm, so as to perform weight sorting on the news by using same, predicts top-N pieces of news as front page news, and calculates the value of the i$^{th}$ row and the j$^{th}$ column of the H-index supporting contribution matrix according to the similarity network.

$$SHCM_{ij} = \begin{cases} A_{ij} & \text{If } D(v_j) > H(v_i) \\ 0 & \text{Others} \end{cases},$$

$$v_j \in N(v_i)$$

wherein, A$_{ij}$ represents the value of the i$^{th}$ row and the j$^{th}$ column of the adjacent matrix of the network, v$_i$ represents a target node, v$_j$ represents a node in a domain to which v$_i$ belongs, D(v$_j$) represents a degree of the node v$_j$ in an adjacent domain, and H(v$_i$) represents an H index of the target node v$_i$;

(2) after traversing and calculating the similarity network, the front page news prediction module iteratively calculates an HR value of the vector according to the proportion of the node v$_i$ in the network G$_{SHCM}$, represented by an adjacency function l(v$_i$,v$_j$), in the total number of nodes in the v$_i$ domain N$_{SHCM}$(v$_i$) and the H-index supporting contribution matrix:

$$HR = \begin{pmatrix} \frac{1-d}{N_{SHCM}} \\ \frac{1-d}{N_{SHCM}} \\ \vdots \\ \frac{1-d}{N_{SHCM}} \end{pmatrix} + d \begin{pmatrix} l(v_1, v_1) & l(v_2, v_2) & \cdots & l(v_1, v_n) \\ l(v_2, v_1) & \ddots & \cdots & \\ \vdots & \vdots & l(v_i, v_j) & \cdots \\ l(v_N, v_1) & \cdots & \cdots & l(v_N, v_N) \end{pmatrix} HR$$

wherein, d represents a damping coefficient, and it is defined that d=0.85, N$_{SHCM}$(v$_i$) represents the domain of the node v$_i$ in the network G$_{SHCM}$, D$_{SHCM}$(v$_j$) represents the degree of the node v$_j$ in the network G$_{SHCM}$,Sort$_i$ represents the element in a sorting sequence obtained on the basis of a certain sorting algorithm, and N represents a prediction length of Top-N prediction.

The number of nodes in the network G$_{SHCM}$ is N$_{SHCM}$=|V$_{SHCM}$|, if the node v$_i$ in the network G$_{SHCM}$ is not adjacent to the node v$_j$ in the network G$_{SHCM}$, the adjacency function l(v$_i$,v$_j$)=0, and Top-N prediction is performed on the above result to obtain a low-dimensional text feature vector representation R$_i$=Sort$_i$, if i<N.

The above descriptions are preferred embodiments of the present invention. It should be noted that the above embodiments illustrate the present invention, however, the present invention is not limited thereto, and those skilled in the art can design alternative embodiments without departing from the scope of the appended claims. For those skilled in the art, various other corresponding modifications and deformations can be made according to the technical solutions and concepts described above, and all these modifications and deformations should fall within the protection scope of the claims of the present invention.

INDUSTRIAL APPLICABILITY

The solution provided by the embodiments of the present application can predict the top-N pieces of news as front page news. In the technical solution provided by the embodiments of the present application, the keywords to be queried can be firstly input by means of the user interface, the web pages are collected on the Internet, the web crawler is compiled by using the Python, and a crawling program saves the collected news text information on the web pages in the local database according to the input related information. An H-centrality sorting algorithm is combined with a PageRank sorting algorithm, and the advantages of considering both local centrality and global centrality are utilized to effectively alleviate the computational burden of a super-large matrix multiplication caused by random walks in huge networks, and to reduce search result errors caused by the PageRank algorithm being affected by directly connected nodes with less importance.

What is claimed is:

1. A front page news prediction and classification method, comprising the following steps: constructing a news network topology by using news text data;
inputting keywords to be queried by means of a user interface, collecting web pages on the Internet based on the keywords;
compiling a web crawler by using an object-oriented programming language Python, loading the web crawler into a news and newspaper text data collection module;
storing collected news text information on the web pages, by the news and newspaper text data collection module, in a local database;
performing data cleaning, by a data cleaning module, on original data obtained from a website;
performing word segmentation, by a text word segmentation module, on the cleaned data by using Jieba;
performing vector representation, by a text representation module, by using a Doc2Vec representation algorithm, so as to convert each news text into a low-dimensional text feature vector with a high amount of information;

calculating the similarity between news, by a similarity network construction module, by using a locality-sensitive hashing (LSH) algorithm, so as to obtain a similarity matrix;

constructing a news similarity network by taking the similarity matrix obtained by LSH calculation as an adjacent matrix of a news related network;

introducing an H index into a PageRank algorithm by a front page news prediction module, calculating an H-index supporting contribution matrix according to the similarity network;

determining whether the similarity network is traversed, if the similarity network is traversed, iteratively calculating an HR value of the vector according to the H-index supporting contribution matrix;

performing weight sorting on the news by using the HR value, and predicting top-N pieces of news as front page news;

wherein, the keywords are keywords of the web pages;

Jieba is a Chinese text segmenter in Python;

the front page news prediction module performs weight sorting on the news, predicts top-N pieces of news as front page news, and calculates the value of the $i^{th}$ row and the $j^{th}$ column of the H-index supporting contribution matrix according to the similarity network:

$$SHCM_{ij} = \begin{cases} A_{ij} & \text{if } D(v_j) > H(v_i) \\ 0 & \text{Others} \end{cases},$$

$v_j \in N(v_i)$, wherein, $A_{ij}$ represents the value of the $i^{th}$ row and the $j^{th}$ column of the adjacent matrix of the network, $v_i$ represents a target node, $v_j$ represents a node in a domain to which $v_i$ belongs, $D(v_j)$ represents a degree of the node $v_j$ in an adjacent domain, and $H(v_i)$ represents an H index of the target node $v_i$;

after traversing and calculating the similarity network, the front page news prediction module iteratively calculates an HR value of the vector according to the proportion of the node $v_j$, the network $G_{SHCM}$, represented by an adjacency function $l(v_i,v_j)$, in the total number of nodes in the $v_i$ domain $N_{SHCM}(v_i)$ and the H-index supporting contribution matrix:

$$HR = \begin{pmatrix} \frac{1-d}{N_{SHCM}} \\ \frac{1-d}{N_{SHCM}} \\ \vdots \\ \frac{1-d}{N_{SHCM}} \end{pmatrix} + d \begin{pmatrix} l(v_1,v_1) & l(v_1,v_2) & \cdots & l(v_1,v_n) \\ l(v_2,v_1) & \ddots & & \cdots \\ \vdots & \vdots & l(v_i,v_j) & \cdots \\ l(v_N,v_1) & \cdots & \cdots & l(v_N,v_N) \end{pmatrix} HR$$

wherein, d represents a damping coefficient, and it is defined that d=0.85, $N_{SHCM}(v_i)$ represents the domain of the node $v_i$ in the network $G_{SHCM}$, $D_{SHCH}(v_j)$ represents the degree of the node $v_j$ in the network $G_{SHCM}$, Sort, represents the $i^{th}$ element in a sorting sequence obtained on the basis of a certain sorting algorithm, and N represents a prediction length of Top-N prediction.

2. The front page news prediction and classification method according to claim 1, wherein the news and newspaper text data collection module compiles the web crawler by using Python, so as to save news text information on the web pages in the format of "time-title-text-page number", and to save the same locally.

3. The front page news prediction and classification method according to claim 1, wherein the data cleaning module performs data cleaning on "picture news" in the original data obtained from the website, deletes some junk information in the original data, then regularizes the data format to delete punctuation and spaces in the text, and meanwhile converts time into a standard 8-bit form YYYYMMDD.

4. The front page news prediction and classification method according to claim 1, wherein the text representation module constructs a sum vector of a word t in news $$i : h(w_t|p_i) = \sum_{k=-\frac{T}{2}}^{\frac{T}{2}} w_{t+i} + p_i$$

wherein, $w_t$ represents a one-hot encoding vector corresponding to the word t in the news, $p_t$ represents a one-hot encoding vector corresponding to the news i, and T represents the number of context words considered in the Doc2Vec_algorithm.

5. The front page news prediction and classification method according to claim 4, wherein the text representation module substitutes the sum vector into a neural network model of the Doc2Vec algorithm for training, so as to obtain the following output function y of the neural network model:

$$y = \text{Softmax}(h(w_t|p_t) \cdot W) + b$$

wherein, $h(w_t|p_t)$ represents the sum vector of the word t in the news i, W represents a hidden layer weight in the neural network model of the Doc2Vec algorithm, and b represents an offset.

6. The front page news prediction and classification method according to claim 5, wherein the text representation module constructs the following loss function Loss=$\Sigma D(y, w_t)$ by using the output function y of the neural network model, and optimizes the loss function to obtain a hidden layer weight $W_{best}$ matrix and a $b_{best}$ offset, wherein, D(•) represents a second-order Euclidean distance between vectors, and $w_t$ represents the one-hot encoding vector corresponding to the word t in the news.

7. The front page news prediction and classification method according to claim 6, wherein the text representation module obtains, with the one-hot encoding vector $p_t$ corresponding to the news i as an input and according to the hidden layer weight $W_{best}$ in the trained neural network model, a low-dimensional text feature vector representation $R_t$: $R_t = p_t \cdot W_{best}$.

8. The front page news prediction and classification method according to claim 1, wherein the number of nodes in the network $G_{SHCM}$ is $N_{SHCM} = |V_{SHCM}|$, if the node $v_i$ in the network $G_{SHCM}$ is not adjacent to the node $v_j$ in the network $G_{SHCM}$, the adjacency function $l(v_i,v_j)=0$, and Top-N prediction is performed on HR value calculation result to obtain a low-dimensional text feature vector representation $R_t = \text{Sort}_i$, if i<N.

* * * * *